(12) United States Patent
Alonso Oliva

(10) Patent No.: US 10,996,544 B2
(45) Date of Patent: May 4, 2021

(54) MOTOR VEHICLE CAMERA HOUSING ASSEMBLY AND METHOD FOR MAKING IT

(71) Applicant: FICOSA ADAS, S.L.U., Barcelona (ES)

(72) Inventor: Daniel Alonso Oliva, Barcelona (ES)

(73) Assignee: FICO ADAS, S.L.U., Barcelona (ES)

( * ) Notice: Subject to any disclaimer, the term of this patent is extended or adjusted under 35 U.S.C. 154(b) by 0 days.

(21) Appl. No.: 16/685,356

(22) Filed: Nov. 15, 2019

(65) Prior Publication Data

US 2020/0225561 A1    Jul. 16, 2020

(30) Foreign Application Priority Data

Nov. 15, 2018  (EP) ...................................... 18382804
Oct. 21, 2019  (EP) ...................................... 19382917

(51) Int. Cl.
*G03B 17/08*      (2021.01)
*B60R 11/04*      (2006.01)

(52) U.S. Cl.
CPC .............. *G03B 17/08* (2013.01); *B60R 11/04* (2013.01)

(58) Field of Classification Search
None
See application file for complete search history.

(56) References Cited

U.S. PATENT DOCUMENTS

| | | | | |
|---|---|---|---|---|
| 2013/0142504 A1* | 6/2013 | Warren | ................... | G03B 17/08 396/541 |
| 2014/0132768 A1* | 5/2014 | Choi | ..................... | H04N 5/2252 348/148 |
| 2015/0205186 A1* | 7/2015 | Park | ....................... | G03B 17/08 348/373 |
| 2019/0127216 A1* | 5/2019 | Tagaya | ................... | H04N 5/2252 |
| 2019/0212549 A1* | 7/2019 | Choi | ......................... | B32B 7/02 |
| 2019/0391465 A1* | 12/2019 | Li | .......................... | H04N 5/2253 |
| 2020/0218136 A1* | 7/2020 | Au | ........................... | G03B 17/08 |
| 2020/0225561 A1* | 7/2020 | Alonso Oliva | ........ | G03B 17/08 |
| 2020/0301253 A1* | 9/2020 | Ye | ............................ | G03B 17/08 |

FOREIGN PATENT DOCUMENTS

| | | |
|---|---|---|
| EP | 2393277 A1 | 12/2011 |
| JP | 2014049536 A | 3/2014 |
| KR | 20120003036 A | 1/2012 |
| KR | 20160046256 A | 4/2016 |
| WO | 2011096958 A1 | 8/2011 |

OTHER PUBLICATIONS

Extended European Search Report for European Application No. 18382804.5; Date of Completion: Mar. 27, 2019; dated Apr. 2, 2019; 7 Pages.

* cited by examiner

*Primary Examiner* — William B Perkey
(74) *Attorney, Agent, or Firm* — Cantor Colburn LLP

(57) ABSTRACT

The motor vehicle camera housing assembly comprises first and second housing parts that define an inner space and joining means for joining housing parts together including a sheet material wound more than one turn around the housing assembly. The sheet material has a support layer and at least one adhesive layer adhered to respective outer surfaces of the housing parts at least partially filling a gap formed in an overlapping portion defined by two edges of the sheet material when wound on the housing parts such that they are sealingly joined together.

20 Claims, 5 Drawing Sheets

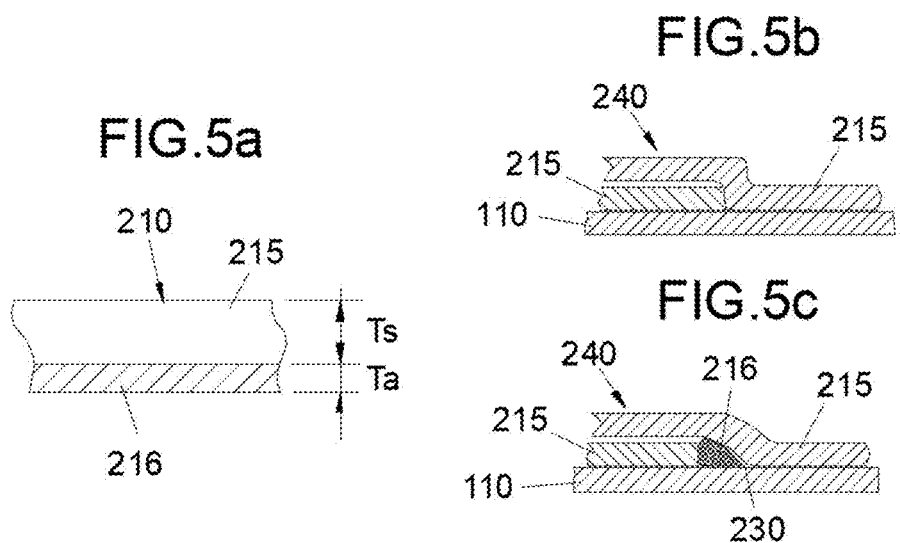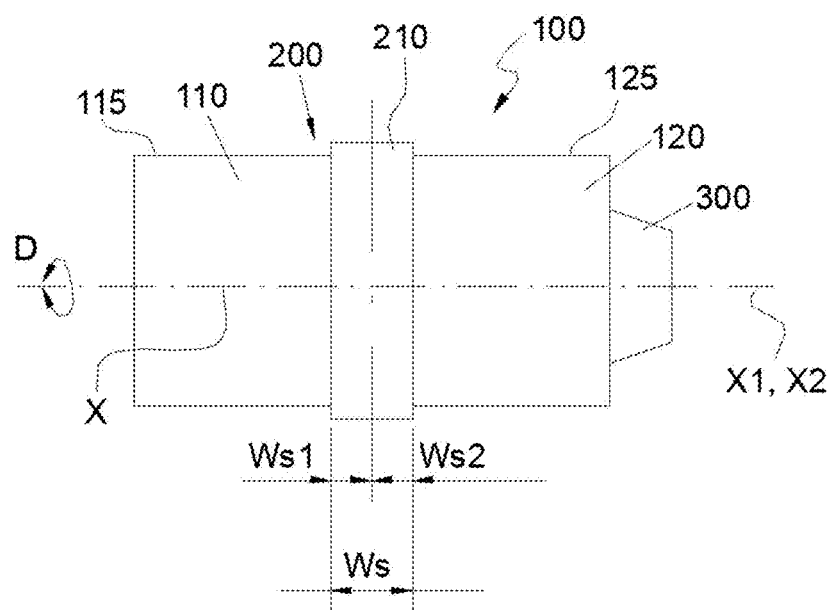

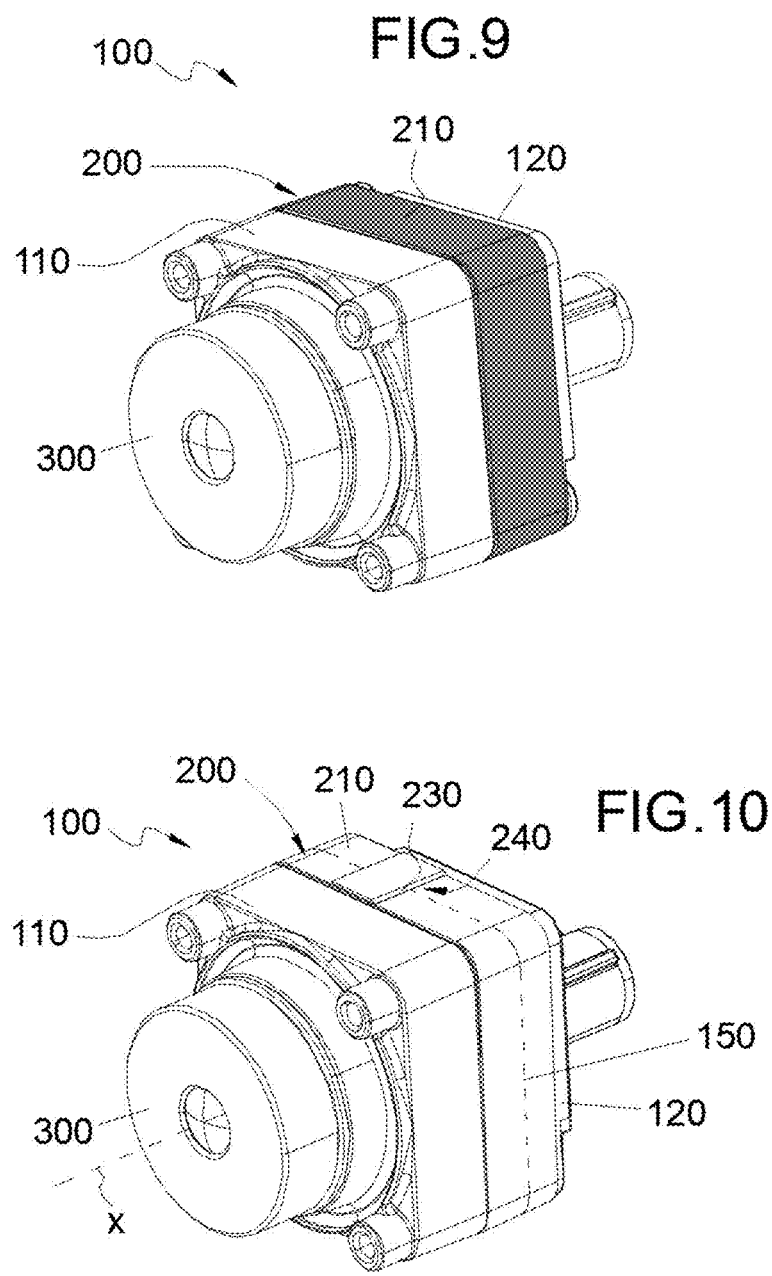

MOTOR VEHICLE CAMERA HOUSING ASSEMBLY AND METHOD FOR MAKING IT

CROSS-REFERENCE TO RELATED APPLICATIONS

This Application claims priority to European Patent Application No. 19382917.3, filed Oct. 21, 2019, and European Patent Application No. 18382804.5, filed Nov. 15, 2018, both of which are incorporated herein by reference in their entirety.

BACKGROUND

The present disclosure relates to cameras for motor vehicles, and more specifically to housing assemblies for housing camera electronics components therein and methods for making them.

Cameras in motor vehicles such as parking cameras typically include a housing inside of which housing camera electronics components are received. The housing generally comprises a first part or front housing and a second part or back housing. Until only some years ago, both housing parts have been generally made of injection molded plastics joined together by ultrasonic welding.

At present, motor vehicle cameras are more powerful, and often include an ECU (Electronic Control Unit) that generates great amounts of heat inside the housing. In order to dissipate heat as quickly as possible to the outside, housing parts made of plastics have been replaced with housing parts made of metal, for example aluminum as it is a good thermal conductor.

Metal housing parts are usually made by machining or by injection molding. Machining provides better surface finish and thus greater accuracy, while injection molding is faster and more cost-efficiently, but results are less accurate in terms of manufacturing tolerances which adversely affects sealing performance. Laser welding has been an alternative to ultrasonic welding for joining aluminum housing parts together in motor vehicle cameras. However, laser welding is costly and time consuming since it usually involves long operating cycles for suitably joining aluminum housing parts. In any case, welding involves added material and thus problems in fitting the housing assembly inside a vehicle. Also, welding does not ensure alignment of the housing parts. If no welding material is delivered problems usually occur due to dust and dirt in an interface between the housing parts. Also, aluminum welding is likely to create micropores in the welding area which also adversely affects sealing performance. Welding may thus be unsatisfactory.

Further approaches based on screws or bolts have been also proposed for joining metal housing parts together in order to reduce costs. A problem derived from the use of screws or bolts is that fluids such as water from the outside of the housing assembly of the motor vehicle camera may enter for example a gap between the housing parts or even a space between the screws and the threads. In an attempt to overcome this issue, sealing means such as rubber gaskets have been provided between the housing parts. Additional sealing means have been provided between the screw heads and the housing parts. This undesirably adds complexity and volume due to the space occupied by screws and rubber gaskets and does not ensure sealing of the assembly while still involving problems derived from heat dissipation since rubber is a thermal insulation material resulting in poor heat dissipation as compared to welding. In addition, in order to place the screws or bolts for attaching the housing parts to each other, pre-alignment is required for the holes or threads in the housing parts to be aligned with each other in order to ensure proper insertion of the screws or bolts. Pre-alignment is typically achieved through the use of centering pads or any guiding means that provide temporary alignment of the holes or threads in the housing parts. Beyond the complexity that is added by the centering pads or guiding means, existing manufacturing geometric tolerances associated with the housing parts results in that a minimum pre-alignment required between the housing parts is not achieved. This results in that the screws or bolts cannot be properly inserted in the holes or threads in the housing parts.

Injection molding housing parts exhibit manufacturing tolerances in their geometry. In order to overcome this, pre-alignment or centering pads are formed protruding from one housing part for being inserted into corresponding recesses formed in the other housing part. This also adds complexity and thus costs, which is not desired.

It is thus an object of the present disclosure to provide a light, simple, and cost-effective motor vehicle camera housing assembly whose housing parts can be assembled efficiently while being suitably sealed and aligned with each other.

A further object of the present disclosure is to provide a motor vehicle camera housing assembly with improved sealing performance. Still a further object of the present disclosure is a method for making a vehicle camera housing assembly.

SUMMARY

According to a first aspect of the present disclosure, a motor vehicle camera housing assembly is provided, for example a housing assembly for receiving a parking camera and other electronics components therein. Other types of cameras to which the present disclosure can be applied are of course not ruled out.

The present motor vehicle camera housing assembly comprises first and second housing parts and joining means for joining the first and second housing parts together so as to define an inner space. Such inner space is typically suitable for holding electronics components, optical components, and other components therein.

The joining means comprise a sheet material, such as for example, a tape. For the purposes of being applied to automotive field, the sheet material is preferred to be made from a heat-resistant material capable of withstanding temperature ranges of the order of between −40° and 150° C., and even more, and whose adhesive properties are not altered by temperature conditions within the operating range. In general, the sheet material is preferred to be resistant against attack of external agents such as chemicals, saline mist, etc.

It may be preferred that at least one of the first housing part, the second housing part, and the sheet material is made from a heat dissipating material. It may be also preferred that the sheet material is made from the same material as at least one of the first and second housing parts, and most preferred from the same material as both the first housing part and the second housing part. As a result, respective coefficients of thermal expansion are all similar so that the housing assembly behaves as a block under temperature changes.

In general, it is preferred that the sheet material is made from a material suitable to avoid tensile elongations. It is also preferred that the sheet material is made from a wear-resistant material. A first material from which the sheet material can be made is plastics preferably containing polyurethane such as for example a Paint Protection Film 8592 tape commercially available from 3M. Another example of a material from which the sheet material can be made is a conductive material such as a metal, for example aluminum. In general, it is preferred a material having Electromagnetic Compliance, EMC, contributing to improve building a Faraday cage. Still in some applications, the sheet material may be preferred to be made from a malleable material so as to have good surface adaptability. It is also preferred that the sheet material is made from a fluid and dust tight material. The use of a fluid and dust tight sheet material is most preferred for the purposes of reliably sealing the housing assembly. A fluid and dust tight motor vehicle camera housing assembly is advantageously obtained whether it is made from aluminum or plastics, or manufactured by machining or injection molding, with or without delivering welding material.

The sheet material is wound more than one turn on the first and second housing parts, according to a winding direction, around a longitudinal axis of the housing assembly. A longitudinal axis of the housing assembly may be defined herein as a line extending along the length of the first and second housing parts. A longitudinal axis of the housing assembly may be also defined herein as a line passing through a centroid of the cross sections of the first and second housing parts.

More particularly, the sheet material has a support layer and at least one adhesive layer. Two opposite adhesive layers, for example, might be provided if required, arranged between which the support layer is arranged, for example. The adhesive layer may comprise, for example, a curable adhesive material. Other suitable adhesive materials are possible as long as they are suitable to be adhered to respective outer surfaces of the first and second housing parts for tightly joining them together.

It has been found that not all types of sheet materials are suitable for the purposes of the present motor vehicle camera housing assembly. In particular, the sheet material suitable for the purposes of the present motor vehicle camera housing assembly is one that at least partially fills a gap that is formed in the vicinity of an overlapping portion defined by two opposite edges of the sheet material when wound on the first and second housing parts. As a result, the first and second housing parts are sealingly attached together. Such gap is formed when sheet material is wound on the first and second housing parts, after the sheet material has been wound once and the second turn of the sheet material starts, and a new turn of the sheet material overlaps the previous turn of the sheet material resulting in a channel-shaped gap between the turns of the sheet material formed along a connecting line defined by an interface of the first and second housing parts, that is, in the interface defined there between. The gap is at least substantially perpendicular to the connecting line and is at least partially filled or taken up by the sheet material when wound on the first and second housing parts. Otherwise, when the material from which the sheet material is made of metal such as aluminum, or any metal having high malleability equal to or greater than that of copper, a turn of the sheet material on the first and second housing parts suitably fits the shape of a previous turn of the sheet material on the housing parts.

Filling the gap by the adhesive layer advantageously results in a fluid communication between the connecting line and the gap being prevented. A fluid communication between the exterior of the camera assembly and the interior thereof is thus also advantageously prevented.

The sheet material is preferably wound around the first and second housing parts such that a contact pressure is exerted perpendicular to the longitudinal axis of the housing assembly. Winding of the sheet material on the first and housing parts thus results in their mutual alignment due to the contact pressure substantially perpendicular to their outer surfaces directed into the interior of the camera housing assembly.

Regarding the pressure exerted by the sheet material when wound on the first and second housing parts, it has been found that when pressure values are lower than 5 N contact on the outer surfaces of the housing parts could be then not sufficient for ensuring a fluid-tight attachment of the housing parts. It has been also found that when pressure values are greater than 8 N the sheet material becomes detached from the outer surfaces of the housing parts and the sheet material cannot be properly wound. Thus, preferred values for the pressure exerted by the sheet material when wound on the first and second housing parts may range, for example, from 5 to 8 N, such as 5.2 to 7.4 N. Other values could be used.

In practice, the above-mentioned longitudinal axis of the housing assembly may be coincident or at least parallel with an optical axis of an electronics component received inside the housing parts, such as for example, a parking camera.

It is also preferred that the sheet material has a width dimension such that, in use, a first part of the width dimension of the sheet material is attached to the first housing part and a second part of the width dimension of the sheet material is attached to the second housing part, with the first and second housing parts being tightly attached together. Preferably, the first and second parts of the width dimension are at least substantially equal.

Winding of the sheet material on the first and second housing parts may cause them to be joined together such that a cross sectional area of the first housing part is at least partially coincident with a cross sectional area of the second housing part, that is, they are properly, "rotationally aligned". As used herein, rotational misalignment refers to one housing part at least slightly rotated with respect to the other housing part, for example, around a longitudinal axis thereof. In this case, a winding direction around which the sheet material is wound around the housing parts corresponds to the shortest way they are rotated to each other such that their respective cross-sectional areas become at least substantially coincident with each other. The winding direction may be also defined as the one involving the smallest angle that the first and second housing parts should be rotated to each other to become rotationally aligned. Winding of the sheet material around the housing parts according to the winding direction thus results in the first and second housing parts being properly, rotationally aligned.

In practice, in order to apply the sheet material around the housing parts, on their outer surfaces, one of the first and second housing parts is fixed while the other of the first and second housing parts is dragged in rotation in order to compensate for an existing angular offset as the sheet material is wound on the first and second housing parts. It is thus noted that the winding direction may be different depending on which one of the first and second housing parts is fixed or is to be rotated. In any case, as stated above, the winding direction is the one involving the smallest angle that the first and second housing parts should be rotated to each other to become rotationally aligned. It is preferred that the sheet material is started to be wound at an area located between an edge of the first housing part and an adjacent edge of the second housing part. In this way, the sheet material contacts the housing part that is not fixed, that is, the one to be rotated as soon as possible.

Also, winding of the sheet material on the first and second housing parts may cause them to be positioned such that their respective first and second longitudinal axes are aligned with each other along the longitudinal axis, that is, they are properly, "linearly aligned". As used herein, linear misalignment refers to one housing part that becomes displaced linearly to the other housing part, for example horizontally and/or vertically, e.g. up, down, towards the right, towards the left etc., on a plane corresponding to an interface or a contact surface thereof.

It is preferred that a ratio of a thickness of the adhesive layer of the sheet material to a thickness of the support layer of the sheet material is equal to or higher than 0.25. For example, a support layer may be 0.2 mm thick while an adhesive layer may be 0.05 mm thick. It is noted that when the sheet material is made of aluminum, the gap is reduced upon applying pressure thereon when wound on the housing parts. The above-mentioned adhesive layer thickness/support layer thickness ratio is thus reduced and therefore lower than that of the sheet material when made of plastics which is greater than 0.25, and more preferably greater than 0.65. For example, a support layer may be 0.2 mm thick while an adhesive layer may be 0.13 mm thick especially for sheet materials made of plastics. It has been found that such thickness ratio properly ensures suitable sealing of the housing assembly.

In one example, the support layer is made of plastics. In other examples, the support layer is made of metal such as aluminum. In general, the material from which support layer is made preferably has a malleability to at least partially close the above-mentioned gap.

Sheet materials made of plastics usually have great flexibility but low malleability, while sheet materials made of metal such as aluminum or copper usually have lower flexibility but greater malleability. Great flexibility is advantageous since the sheet material can be stretched so as to extend its length by applying a relatively small force which provides high contact pressure. The more the sheet material is stretched the larger the gap will be. Plastics sheet material is a good option for providing good contact pressure while metal sheet material is a good option for providing good gap filling. In any case, it may be advantageous that at least one end of the sheet material, in the overlapping portion thereof when wound on the first and second housing parts, has a gradually decreasing thickness.

According to a second aspect of the present disclosure, a method is also provided for making a vehicle camera housing assembly. The method comprises providing at least a first housing part and a second housing part and bringing the first and second housing parts close together. The method further comprises winding a sheet material more than one turn on respective outer surfaces of the first and second housing parts according to a winding direction for permanently joining them together so as to define an inner space suitable to hold electronics components therein.

As stated above, winding the sheet material on the outer surfaces of the first and second housing parts according to a winding direction creates a gap in the vicinity of an overlapping portion defined by two opposite edges of the sheet material which is at least partially filled by the sheet material. As a result, the first and second housing parts are sealingly joined together.

When the sheet material has a support layer made of a malleable material, the method may further comprise applying pressure to the support layer such that the sheet material tightly fits the respective outer surfaces of the first and second housing parts.

A step of applying heat may be performed for curing the sheet material if required. This may be carried out once the adhesive sheet material has been wound around at least one outer portion of the first and second housing parts.

The step of bringing the first and second housing parts close together may involve defining a spacing there between which may substantially correspond to or be shorter than the width of the sheet material.

The nature of the joining means in the present housing assembly allows for an efficient attachment its housing parts, efficiently correcting and preventing linear and rotational misalignments between them even if they have their outer surfaces stepped relative to one another, i.e., when a distance from the outer surface of the first housing part to a longitudinal axis of the first housing part is different from a distance from the outer surface of the second housing part to a longitudinal axis of the second housing part. Differences in such distances may range between 0 mm and 10 mm such as for example between 0.1 mm and 3 mm.

The sheet material is wound around the first and second housing parts fully encapsulating, i.e. completely surrounding, them as a result of which sealing is ensured such that fluids and other external particles are prevented from entering the interior of the housing assembly and coming into contact with the electronics components therein.

Alignment ensures proper operation of the optical parts within the housing assembly as well as suitable fitting of the housing assembly in an inner space of a motor vehicle, that is, a good vehicle integration is achieved. Extra sealing such as rubber gaskets and attaching means such as screws or welding are no longer required. Centering pads acting as pre-aligning or pre-fixing means are no longer necessary. Overall size and costs are reduced, and relative movements between the housing parts due to the manufacture tolerances are advantageously suppressed.

However, although the joining means in the present motor vehicle camera housing assembly causes the housing parts to be properly rotationally and linearly aligned with each other, and the first and second housing parts could be pre-aligned with each other, that is, with their respective longitudinal axes at least substantially aligned with each other before being fully assembled. As stated above, a longitudinal axis may be defined herein as a line extending along the length of the first and second housing parts and/or as a line passing through a centroid of the cross sections of the first and second housing parts. In some cases, the longitudinal axis may be defined by a line extending perpendicular to the interface of the first and second housing parts, that is, a plane containing the connecting line, and passing through the geometrical center of the first and second housing parts.

Attaching, sealing and alignment of the housing parts is efficiently and reliably achieved. Thus, the use of joining means performing such an aligning-teaching-sealing function is very advantageous for the purposes of the present camera housing assembly when fitted in a motor vehicle part.

A recess may be formed at respective end portions of the first and second housing parts. Such recess is configured for receiving the adhesive sheet material. The depth of the recess is preferred to substantially correspond to the thickness of the adhesive sheet material and specifically to the thickness of the adhesive sheet material wound a number of turns around an outer perimeter of the first part and/or the second housing part, depending on requirements. As a result of the recess, once the adhesive sheet material is placed in the recess, the adhesive sheet material does not project from the housing parts. The sheet material is advantageously applied securely to the housing assembly and it is not removed even high-pressure fluid act on the housing assembly. As a result of the provision of the recess the sheet material is not required to be necessarily a sealing material in all cases.

The sheet material may be for example 0.07-0.11 mm thick. On the other hand, the sheet material may be for example 4-40 mm wide although in some cases it may be preferred that the sheet material is 4-12 mm wide. Other sizes are of course possible depending on requirements and/or applications. It may be also preferred that the sheet material has a tensile strength: 25-75 N/cm, such as 33.8 or 65 N/cm, with 54 N/cm being preferred; an elongation at break: 3-10%, such as 5%; with 7% being preferred; a steam transfer coefficient: 0.5-2 g/m2/24 h, such as 0.77 g/m2/24 h, with 1.55 g/m2/24 h being preferred; and a coefficient of thermal expansion: □15% of that of the housing part, for example $2.4 \cdot 10^{-5}$ C.−1 for aluminum or $1.7 \cdot 10^{-5}$ C.−1 for copper.

In one possible example of the present housing assembly, the sheet material may be made integral with at least one of the first housing part or the second housing part. In this case, the sheet material is an integral part of the housing assembly.

With the present motor vehicle camera housing assembly, cost-effective and reliable joining between housing parts is advantageous obtained. The joining means based on sheet material as described above allows fast assembly of the housing parts. The joining means are arranged completely surrounding the housing parts permanently joining them together. Improved heat dissipation is also obtained as compared with known housing assemblies since less material is required for making the present housing assembly. This also involves reduced weight due to reduced housing wall thickness. As a result of this, the space available inside the housing is advantageously increased. Overall camera size can be thus reduced as well as assembly times and costs.

BRIEF DESCRIPTION OF THE DRAWINGS

The following descriptions should not be considered limiting in any way. With reference to the accompanying drawings, like elements are numbered alike:

A non-limiting example of the present disclosure will be described in the following, with reference to the appended drawings.

FIG. 5a is a fragmentary enlarged view of the sheet material that is part of the joining means;

FIG. 5b is a fragmentary sectional view of a metal sheet material applied on an outer surface of a housing part;

FIG. 5c is a fragmentary sectional view of plastics metal sheet material applied on an outer surface of a housing part;

FIG. 6 is a diagrammatic elevational view of the present motor vehicle camera housing assembly with the first and second housing parts attached together by means of the sheet material where some sheet material dimensions are shown;

FIG. 9 is a perspective view of the present vehicle camera housing assembly with the housing parts attached to each other; and FIG. 10 is a perspective view of the vehicle camera housing assembly in FIG. 9 where a connecting line defined in the interface of the first and second housing parts has been depicted.

DETAILED DESCRIPTION

Figure 1:
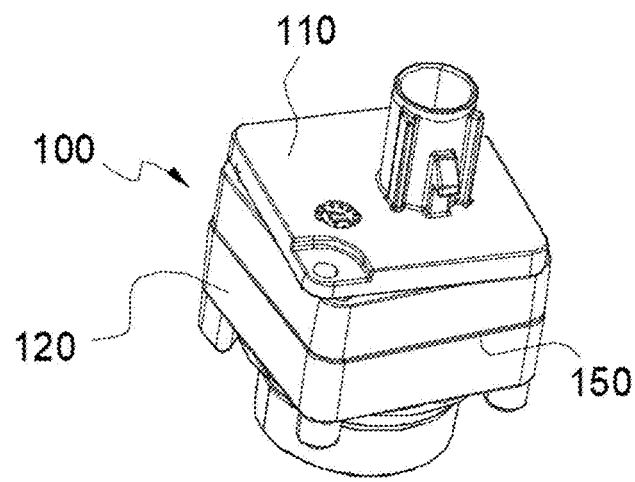
FIG. 1 is a perspective view showing one example of a prior art motor vehicle camera housing assembly with housing parts rotationally misaligned.
Figure 2:
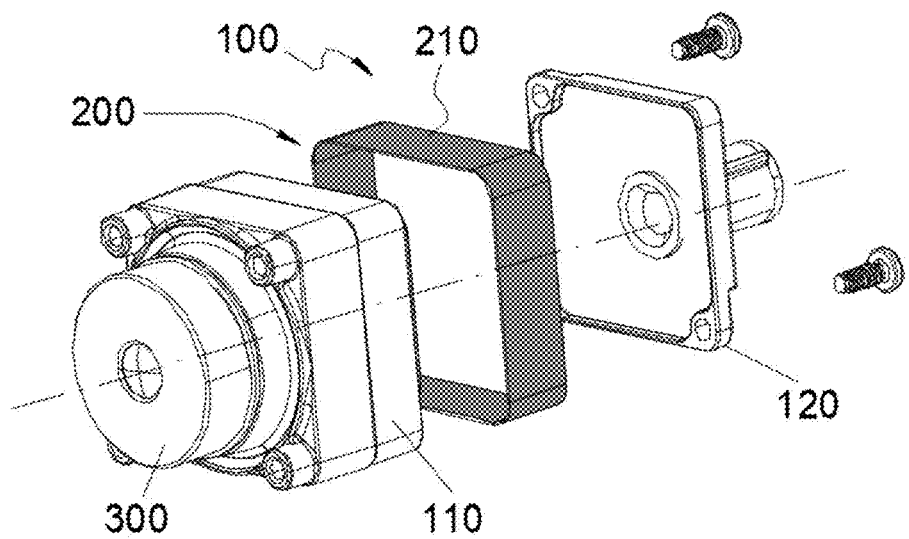
FIG. 2 is an exploded perspective view of one example of the present vehicle camera housing assembly.

A detailed description of one or more embodiments of the disclosed apparatus and method are presented herein by way of exemplification and not limitation with reference to the figures.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made, and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

The example of the motor vehicle camera housing assembly 100 shown in FIGS. 2-6, comprises a first housing part 110 and second housing part 120. In use, as shown in FIGS. 3 and 6-10, the first and second housing parts 110, 120 are attached together through joining means 200 shown in detail in FIG. 4. As a result, an inner space 130 is define therein for holding electronics components such as a PCB and optical elements such as a parking camera 300, etc. In the example shown in FIG. 7, the motor vehicle camera housing assembly 100 is fitted on a vehicle bodywork area 400.

Figure 3:
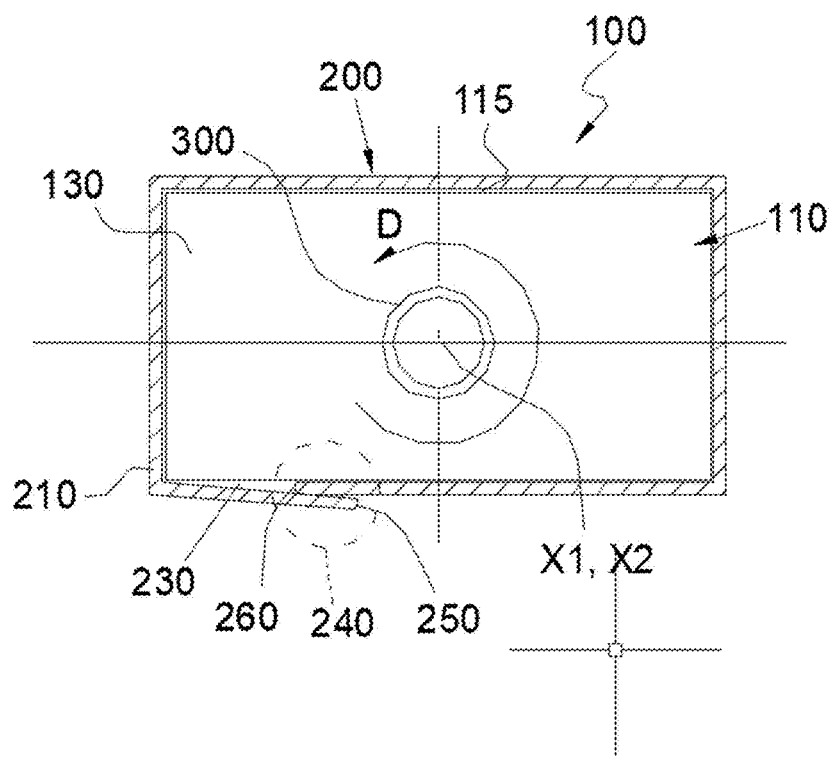
FIG. 3 is a front sectional view of the example of the present motor vehicle camera housing assembly in FIG. 2 with the first and second housing parts attached together by means of the sheet material.
Figure 4:
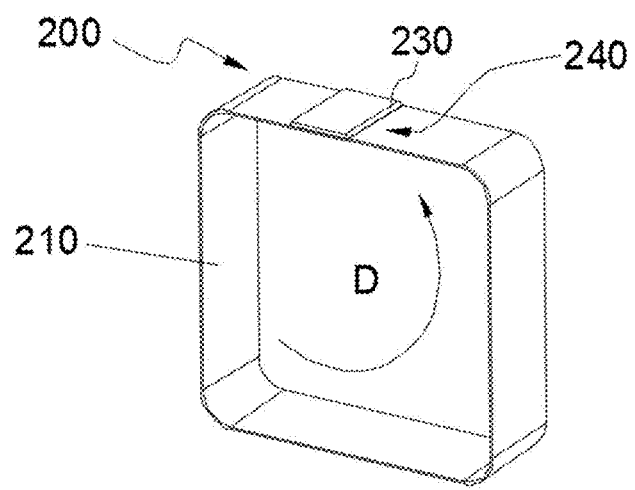
FIG. 4 is a perspective view of one example of joining means for attaching the first and second housing parts of the motor vehicle camera housing assembly in FIGS. 2 and 3.
Figure 7:
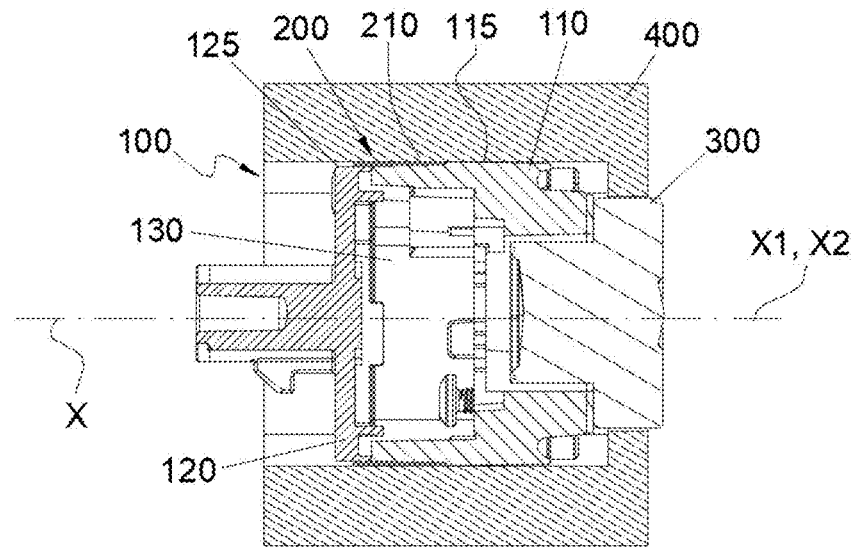
FIG. 7 is a sectional view of the motor vehicle camera housing assembly in FIG. 6, fitted on a vehicle bodywork area.
Figure 8:
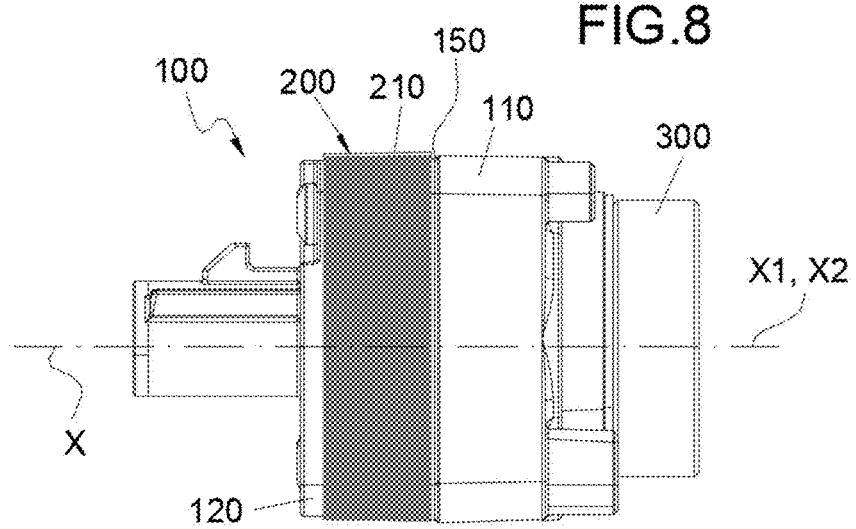
FIG. 8 is a diagrammatic elevational view of the present motor vehicle camera housing assembly with its first and second housing parts attached together by means of the sheet material.

Referring again to FIG. 4 of the drawings, the joining means 200 comprise a sheet material 210 which in the example shown is a plastics tape, although other materials such as aluminum could be used. The plastics tape 210 is wound more than one turn along a winding direction D, as shown in FIGS. 3 and 4, around outer surfaces 115, 125 of the first and second housing parts 110, 120.

As shown in FIG. 5a, the plastics tape 210 has a support layer 215 that carries one adhesive layer 216 comprising a curable adhesive material whose adhesive properties are not altered by temperature or other conditions during use. The adhesive layer 216 is adhered to the respective outer surfaces 115, 125 of the first and second housing parts 110, 120 for joining them together.

Referring to FIGS. 3, 4 5b, and 5c, a gap 230 is formed in the vicinity of an overlapping portion 240 defined by two opposite edges 250, 260 of the plastics tape 210 when wound on the first and second housing parts 110, 120. The gap 230 is formed when the plastics tape 210 after it has been wound once and the second turn starts, and a new turn of the plastics tape 210 is made which overlaps a previous turn of the plastics tape 210. As a result, the gap 230 is formed between the turns of the plastics tape 210, along a connecting line 150, shown in FIGS. 1, 8 and 10 of the drawings. The connecting line 150 is defined at an interface of the first and second housing parts 110, 120, as it can be seen in the FIGS. 1, 8 and 10.

FIG. 5a shows a further example where a sheet material made from a ductile material, such as metal, for example, an aluminum tape 210, is used. In this specific case, when pressure is applied to the support layer 215 the aluminum tape 210 fits the respective outer surfaces 115, 125 of the first and second housing parts 110, 120 and removes the gap 230 as a result of the ductility of the aluminum tape 210.

Instead, in the above described case where a plastics tape 210 is used, the gap 230 is filled or taken up by the plastics tape 210 when wound on the first and second housing parts 110, 120. This is diagrammatically shown in FIG. 5b of the drawings.

Once the plastics tape 210 has been wound around the respective outer surfaces 115, 125 of the first and second housing parts 110, 120, they remain mutually aligned. This is due to a contact pressure that is applied by the plastics tape 210 on the housing parts 110, 120 which is directed into the interior 130 of the camera housing assembly 100, along a direction that is perpendicular to the respective outer surfaces 115, 125 of the first and second housing parts 110, 120, that is, perpendicular to a longitudinal axis x of the housing assembly 100. Force applied to the plastics tape 210 when wound on the first and second housing parts 110, 120 may be, for example, of 2-9 N. In the example shown, a longitudinal axis x of the housing assembly 100 is coincident with an optical axis of an electronics component received inside the housing parts 110, 120, such as for example, a parking camera 300, which in turn corresponds to respective longitudinal axes x1, x2 of the first and second housing parts 110, 120.

In use, when the motor vehicle camera housing assembly 100 is in an assembled condition, as shown in FIGS. 3 and 6-10, the first housing part 110 and the second housing part 120 are arranged flush abutting to one another.

Referring to FIG. 6 of the drawings, the plastics tape 210 has a width dimension Ws. In use, a first part Ws1 of the width dimension Ws of the plastics tape 210 is attached to the first housing part 110 and a second part Ws2 of the width dimension Ws of the plastics tape 210 is attached to the second housing part 120. When the first and second housing parts 110, 120 have been tightly attached together, the first and second parts Ws1, Ws2 of the width dimension Ws of the plastics tape 210 are at least substantially equal.

One important effect of the plastics tape 210 wound around the respective outer surfaces 115, 125 of the first and second housing parts 110, 120 is that a cross sectional area of the first housing part 110 is coincident with a cross sectional area of the second housing part 120 (rotational alignment), as shown in FIG. 3. This allows rotational misalignment in prior art housing assemblies 100 as shown in FIG. 1.

The winding direction D around which the plastics tape 210 is wound around the housing parts 110, 120, as shown in FIGS. 3 and 4, here corresponds to the shortest way they are rotated to each other such that their respective cross-sectional areas become at least substantially coincident with each other. In other words, the winding direction D is the one involving the smallest angle that the first and second housing parts 110, 120 should be rotated to each other around the longitudinal axis x to become rotationally aligned. This is carried out by having the second housing part 120 fixed while the first housing part 110 is dragged in rotation in order to compensate for an existing angular offset as the plastics tape 210 is wound on the first and second housing parts 110, 120. The winding direction D could be different if the first housing part 110 is fixed and the second housing part 120 is dragged in rotation relative to the first housing part 110.

A further important effect of the plastics tape 210 wound around the respective outer surfaces 115, 125 is that the first and second housing parts 110, 120 may be positioned such that their respective first and second longitudinal axes x1, x2 are aligned with each other along the longitudinal axis x of the housing assembly 100 (linear alignment) as shown in FIGS. 6-10. Winding of plastics tape 210 around the first and second housing parts 110, 120 removes horizontal and/or vertical displacement, e.g. up, down, towards the right, towards the left etc., on a plane corresponding to an interface or a contact surface of the first and second housing parts 110, 120.

The plastics tape 210 is started to be wound preferably at an area between an edge of the first housing part 110 and an adjacent edge of the second housing part 120 as a result of which the plastics tape 210 contacts as soon as possible the housing part that is not fixed, that is, the one to be rotated.

In the example herein described, the support layer 215 is 0.2 mm thick and the adhesive layer 216 is 0.13 mm thick. Thus, a ratio of the thickness of the adhesive layer Ta to the thickness Ts of the support layer is equal to or higher than 0.65. It has been found that such thickness ratio properly ensures suitable sealing of the housing assembly 100. The plastics tape 210 is 4-12 mm wide in the example shown and has a tensile strength of 54 N/cm; a steam transfer coefficient of 1.55 g/m2/24 h; and a coefficient of thermal expansion of □15% of that of the housing part ($2.4 \cdot 10^{-5}$ C−1 when it is made of aluminum or $1.7 \cdot 10^{-5}$ C−1 when it is made of copper). Adhesion (i.e. adhesion to steel) of the plastic tape 210 is greater than 10 N/cm. In particular, the adhesion of the plastic tape 210 on the first and housing parts 110, 120 is greater than 40 N/cm, more preferably equal to or greater than 56 N/cm.

A method is also provided for making a vehicle camera housing assembly 100. The method comprises providing at least a first housing part 110 and a second housing part 120 and bringing them close together. A parking camera 300 and respective electronics components are then fitted within an inner space 130 defined inside the first and second housing parts 110, 120. A sheet material 210 is then wound more than one turn on respective outer surfaces 115, 125 of the first and second housing parts 110 120 according to a winding direction D for permanently joining them together so as to define the inner space 130.

Winding the sheet material 210 on the outer surfaces 115, 125 of the first and second housing parts 110, 120 according to the above-mentioned winding direction D fills the above-mentioned gap 230 formed in the vicinity of the overlapping portion 240 defined by two opposite edges 250, 260 of the sheet material 210. As a result, the first and second housing parts 110 120 are sealingly joined together.

Where the sheet material 210 has a support layer 215 that is made of a malleable material such as aluminum, pressure is applied to the support layer 215 such that the sheet material 210 tightly fits the respective outer surfaces 115, 125 of the first and second housing parts 110, 120.

Heat may be applied for curing the adhesive layer 216 in the sheet material 210 if required. This may be carried out once the sheet material 210 has been wound around the first and second housing parts 110, 120. Also, a cleaning operation may be performed by using for example a 50:50 mixture of isopropyl alcohol (IPA) and water.

Although only a number of examples have been disclosed herein, other alternatives, modifications, uses and/or equivalents thereof are possible. Furthermore, all possible combinations of the described examples are also covered. For example, even though from above description it is understood that the adhesive sealing tape is applied to the front and back housings as single, continuous sheet material, other different tape arrangements could be applied such as for example single lengths or segments of adhesive sealing tape to be wound around the housing parts for joining them together permanently. The scope of the present disclosure is therefore not limited by the particular example described above but should be determined only by a fair reading of the claims that follow.

Reference signs related to drawings placed in parentheses in the claims are solely for attempting to increase their intelligibility and shall not be construed as limiting the scope of the claim.

The invention claimed is:

1. A motor vehicle camera housing assembly, comprising:
    a first housing part and a second housing part which, in use, define together an inner space, and joining means for joining the first and second housing parts together; and
    characterized in that the joining means include a sheet material wound more than one turn, according to a winding direction, around a longitudinal axis of the housing assembly, the sheet material having a support layer and at least one adhesive layer that is adhered to respective outer surfaces of the first and second housing parts, wherein when in use, the sheet material at least partially fills a gap that is formed in the vicinity of an overlapping portion defined by two opposite edges of the sheet material when wound on the first and second housing parts such that the first and second housing parts are sealingly joined together.

2. The assembly according to claim 1, wherein the sheet material is wound around the first and second housing parts such that a pressure is exerted perpendicular to the longitudinal axis.

3. The assembly according to claim 1, wherein the sheet material has a width dimension, and when in use, a first part of the width dimension of the sheet material is attached to the first housing part, and a second part of the width dimension of the sheet material is attached to the second housing part, and wherein the first and second parts width dimensions are at least substantially equal.

4. The assembly according to claim 1, wherein the at least one adhesive layer includes a curable adhesive material.

5. The assembly according to claim 1, wherein the at least one adhesive layer has two opposite adhesive layers.

6. The assembly according to claim 1, wherein the first and second housing parts are joined together such that a cross sectional area of the first housing part is at least partially coincident with a cross sectional area of the second housing part.

7. The assembly according to claim 1, wherein the sheet material is wound around the first and second housing parts such that respective first and second longitudinal axes thereof are aligned with each other along the longitudinal axis.

8. The assembly according to claim 1, wherein the winding direction corresponds to the shortest way the first and second housing parts are rotated to each other such that their respective cross-sectional areas of the first and second housing parts become at least substantially coincident with each other.

9. The assembly according to claim 1, wherein the gap is at least substantially filled with material from the at least one adhesive layer.

10. The assembly according to claim 1, wherein a ratio of a thickness of the at least one adhesive layer to a thickness of the support layer is equal to or higher than 0.65.

11. The assembly according to claim 1, wherein the support layer is made of plastics.

12. The assembly according to claim 1, wherein the support layer has a malleability to at least partially close the gap.

13. The assembly according to claim 12, wherein the support layer is made of metal.

14. The assembly according to claim 2, wherein the sheet material has a width dimension, and when in use, a first part of the width dimension of the sheet material is attached to the first housing part, and a second part of the width dimension of the sheet material is attached to the second housing part, and wherein the first and second parts width dimensions are at least substantially equal.

15. The assembly according to claim 14, wherein the at least one adhesive layer includes a curable adhesive material.

16. The assembly according to claim 15, wherein the at least one adhesive layer has two opposite adhesive layers.

17. The assembly according to claim 16, wherein the first and second housing parts are joined together such that a cross sectional area of the first housing part is at least partially coincident with a cross sectional area of the second housing part.

18. The assembly according to claim 17, wherein the sheet material is wound around the first and second housing parts such that respective first and second longitudinal axes thereof are aligned with each other along the longitudinal axis.

19. A method for making a vehicle camera housing assembly, comprising:
    providing at least a first housing part and a second housing part;
    bringing the first and second housing parts close together; and
    winding an sheet material more than one turn on respective outer surfaces of the first and second housing parts according to a winding direction for permanently joining them together so as to define an inner space, whereby a gap formed in the vicinity of an overlapping portion defined by two opposite edges of the sheet material when wound on the first and second housing parts is at least partially filled such that the first and second housing parts are sealingly joined together.

20. The method according to claim 19, further comprising:

applying pressure to a support layer of the sheet material such that the sheet material tightly fits the respective outer surfaces of the first and second housing parts, wherein the support layer is made of a malleable material and the sheet material includes at least one adhesive layer.

* * * * *